United States Patent [19]
Zangenehpour

[11] Patent Number: 4,647,991
[45] Date of Patent: Mar. 3, 1987

[54] DISK CHANNEL CONTROLLER

[75] Inventor: Saied Zangenehpour, Largo, Fla.

[73] Assignee: Paradyne Corporation, Largo, Fla.

[21] Appl. No.: 778,605

[22] Filed: Sep. 20, 1985

[51] Int. Cl.$^4$ .......................... G11B 15/18; G11B 5/09
[52] U.S. Cl. ..................................... 360/72.2; 360/48
[58] Field of Search .......................... 360/72.2, 48, 49

[56] References Cited

U.S. PATENT DOCUMENTS

| | | | |
|---|---|---|---|
| 4,494,156 | 1/1985 | Kadison et al. | 360/48 |
| 4,507,693 | 3/1985 | Matsuda et al. | 360/72.2 |
| 4,554,598 | 11/1985 | Tarbox et al. | 360/48 |

*Primary Examiner*—Vincent P. Canney
*Attorney, Agent, or Firm*—Kane, Dalsimer, Kane, Sullivan & Kurucz

[57] ABSTRACT

This invention pertains to a disk channel controller for controlling data transfer to and from a disk drive formed of several disks. The controller includes data ports for receiving and transmitting data, head tracking circuits for tracking the heads which store and retrieve data to and from the disks, temporary memories and a microprocessor. Except for the microprocessor, all the controller elements are hardwired. A novel disk formatting is also described.

1 Claim, 10 Drawing Figures

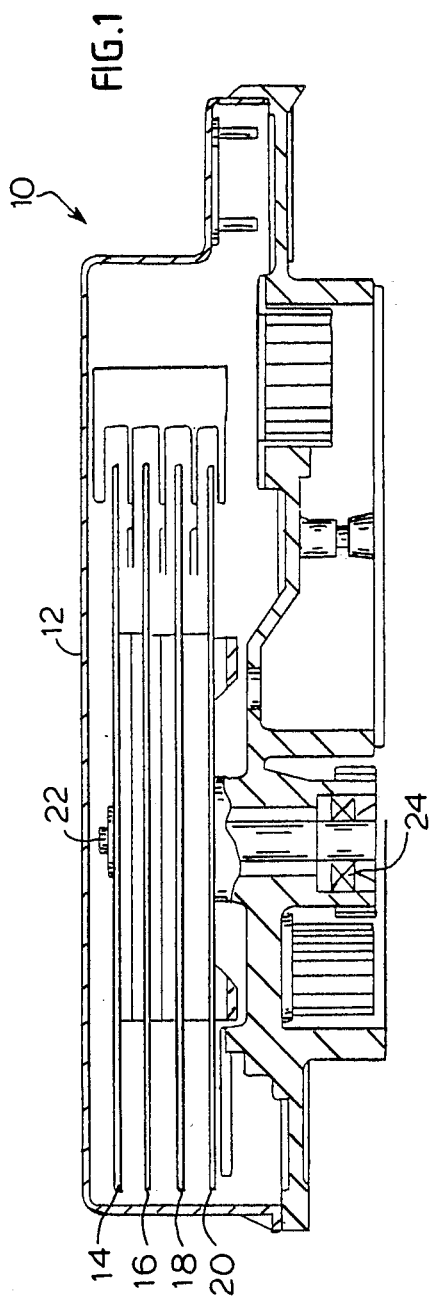
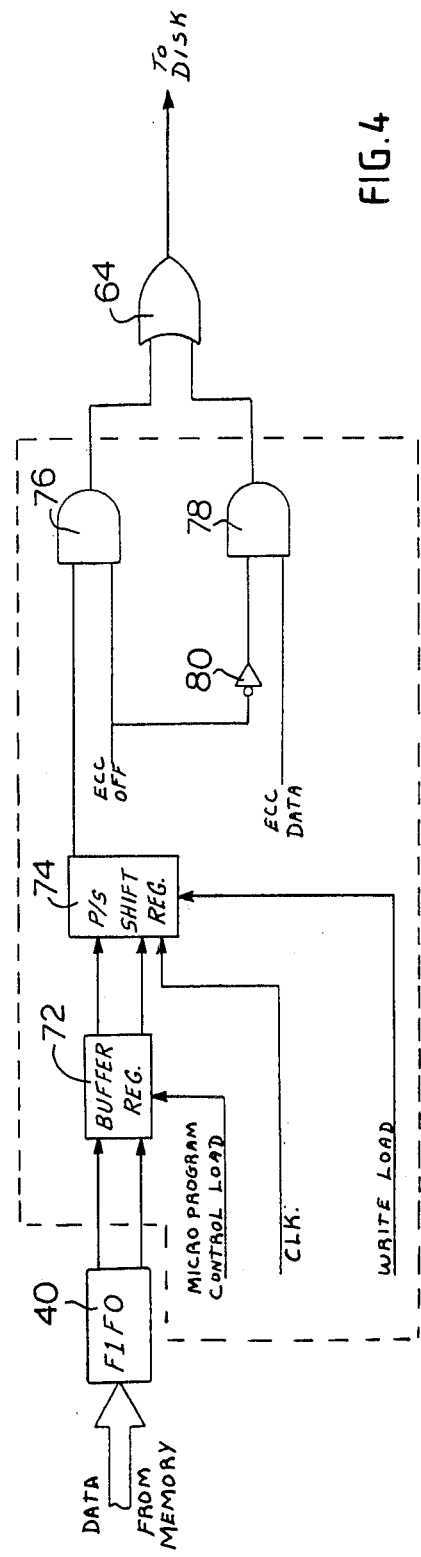

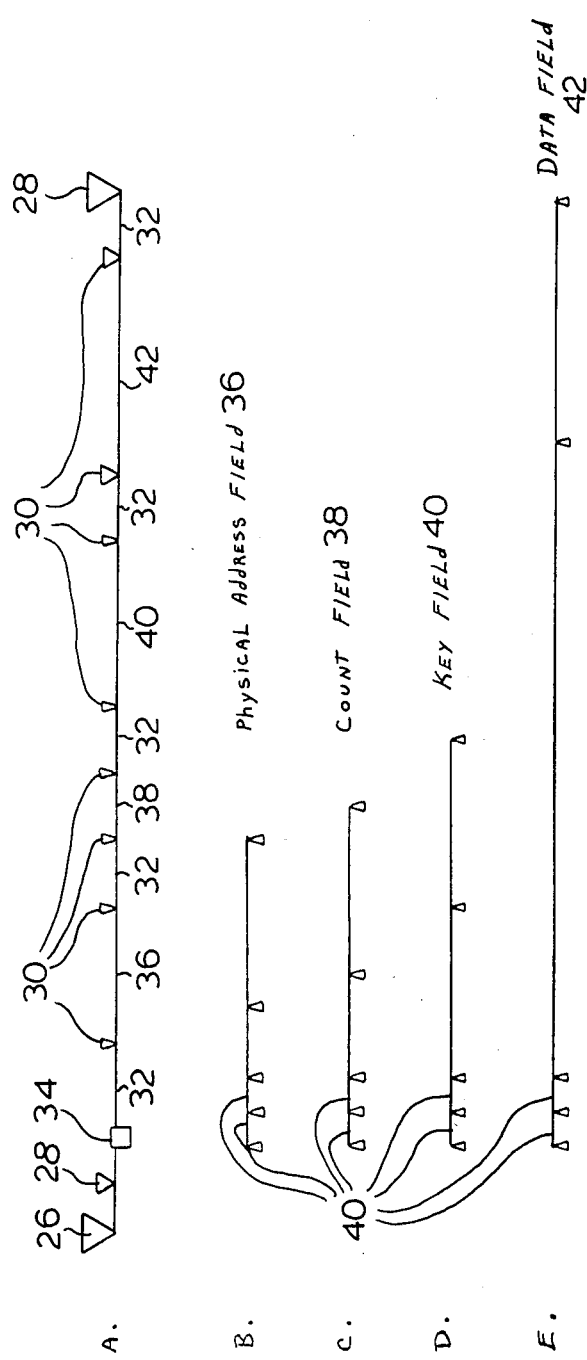

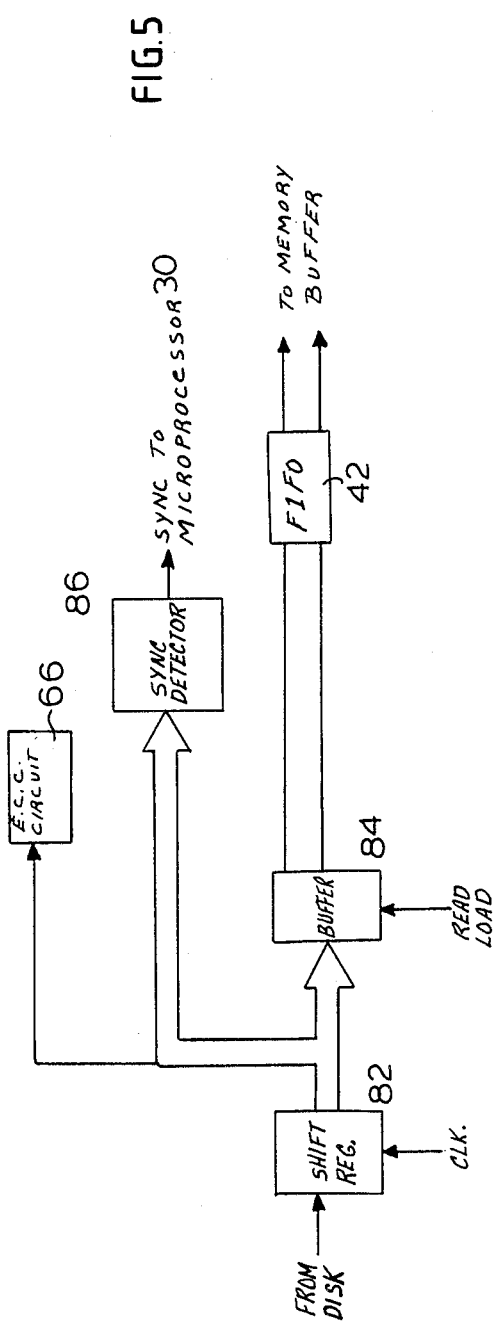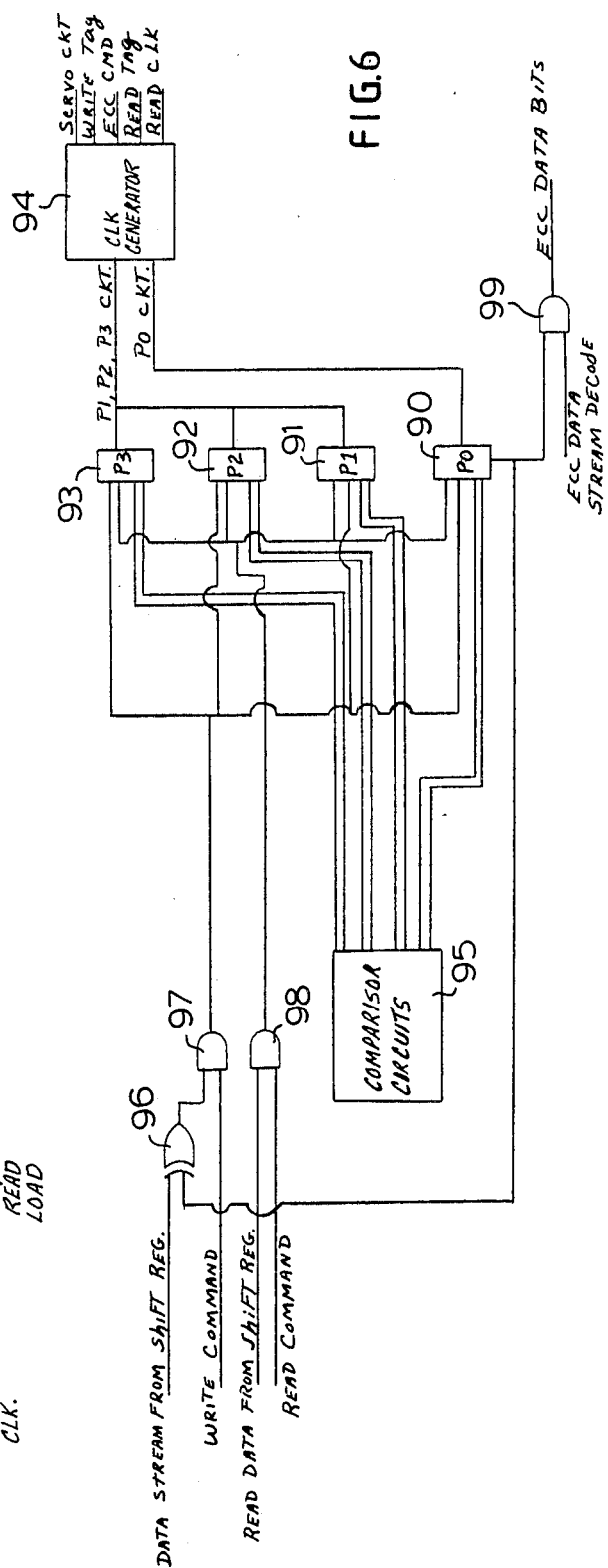

DISK CHANNEL CONTROLLER

BACKGROUND OF THE INVENTION

1. Field of Invention

The present invention relates to a channel controller for magnetic disks used as data storage means for large computers and similar data processing devices, and more particularly, to a controller for a magnetic disk comprising a plurality of double-sided platters.

2. Description of the Prior Art

Presently, most large and medium size computers use magnetic disks for data and program storage. Originally disks having only one active storage and retrieval surface have been used for mini and microcomputers, while for larger computer disks having several storage surfaces are used, each face being accessed by dedicated read/write heads. Data (or programming instructions) are read and written by directing a respective head to the location on a particular surface where the particular binary signals can be saved or retrieved. Thus data may be written or read through several heads sequentially. Of course, this type of data storage systems requires a rather complex controller for directing the heads and reading and writing data efficiently in the correct sequence. All the known prior art channel controllers were machines which incorporated a microprocessor for the channel and another one for the controller, which generate controls based on sequential microcodes stored in the microprocessor random access memory. It was found that these machines do not perform fast enough for the present day computers, and their complex architecture impairs the channel-controllers' reliability. (Mostly because of too many communication between channel and the controller).

OBJECTIVES AND SUMMARY OF THE INVENTION

In view of the above, it is a principal objective of the present invention to provide a fast and efficient disk channel-controller.

Another objective is to provide a channel-controller which may be easily interfaced with a standard main frame computers for data storage. (Currently connected to RESPONSE CPU which is IBM Compatible Main Frame).

Another objective is having an integrated disk channel controller with only one microprocessor being in charge of both channel and the controller.

This will imply more reliable system, less costly system, and also a faster system since the number of communications between channel and controller is an absolute minimum.

A further objective is to provide a disk controller adapted to format the disk by providing each data field formatted to provide maximum data security. Other objectives and advantages of the invention shall become apparent from the following description of the invention.

According to this invention, a disk channel controller comprises data port interfacing means for interfacing with the volatile memory of a computer through parallel data and address ports, serial/parallel conversion means, disk interface means for reading data from or writing data on several disks, serial/parallel memory means and error correcting code generator means. All these circuits are hardwired dedicated circuits which operate under the control of one microprocessor. Since all the transformation of data between memory and disk is done by the hardwired circuits, it is much quicker and reliable than if general purpose microprocessors would be used. Furthermore, since the microprocessor performs only a supervisory function it can be smaller or alternately it could be used to perform other tasks.

To insure complete data security the fields of each sector are partitioned into two subfields, one for control or data bits and one for error correction coding.

BRIEF DESCRIPTION OF THE DRAWINGS

FIG. 1 shows in a somewhat schematic form a typical disk assembly with several disks each having concentric tracks;

FIG. 2, consisting of FIGS. 2A-2E, shows the formatting of one of the disk tracks in accordance with the invention;

FIG. 4 shows a write portion of the serial/parallel circuit of the diagram of FIG. 3; and FIG. 5 shows a read portion of the serial/parallel circuit of the diagram of FIG. 3; and FIG. 6 shows the elements of the error correction coding circuit of the diagram of FIG. 3.

DESCRIPTION OF THE PREFERRED EMBODIMENT

Figure 3:
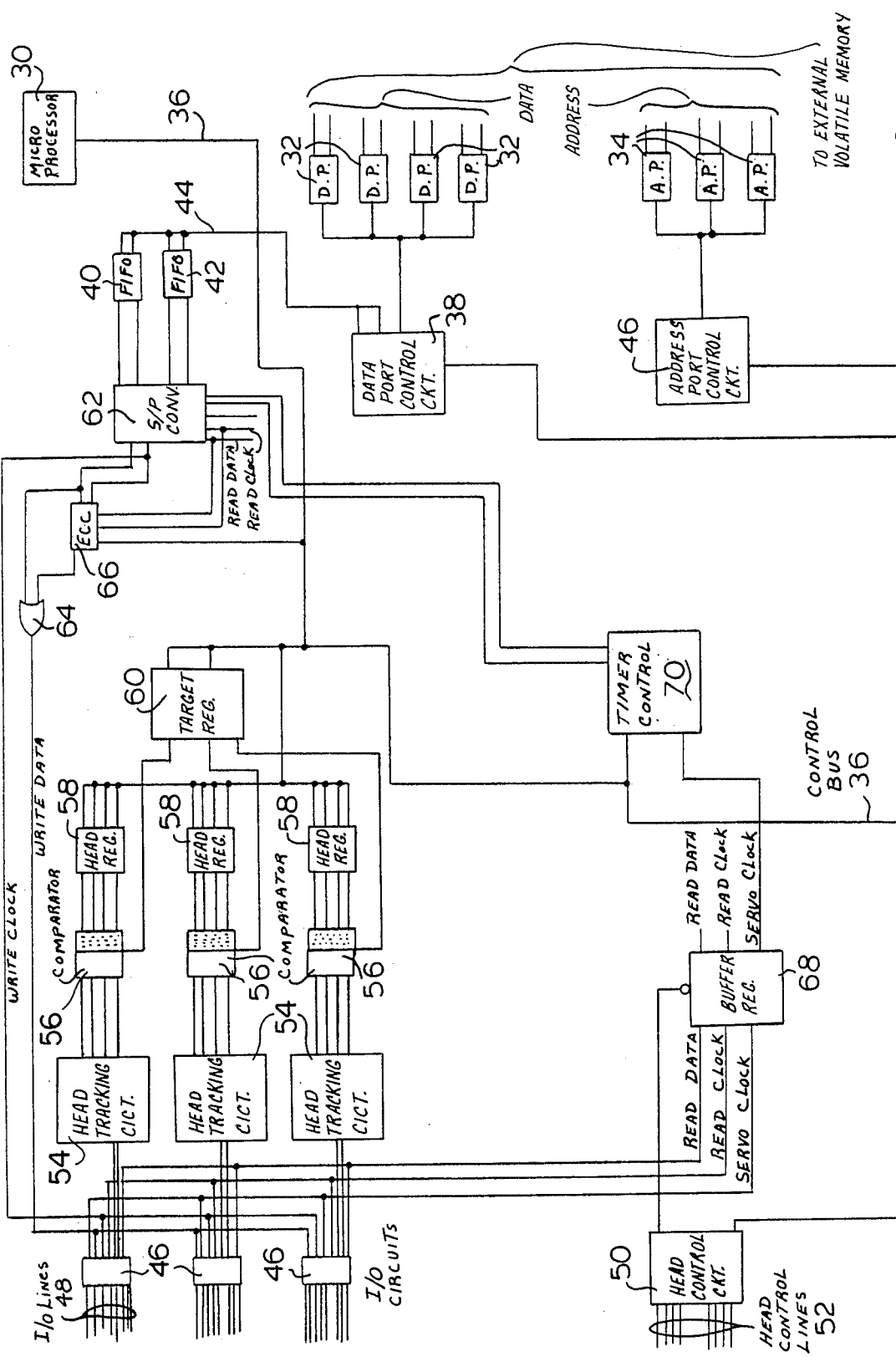
FIG. 3 shows a schematic diagram of the disk controller.

A typical disk assembly 10 is shown in FIG. 1. It comprises a housing 12 which is used to seal a plurality of disks 14, 16, 18 and 20 to protect them from dust, moisture, and various other undesirable environmental hazzards. Each of the disks has two surfaces used to store digital data in a well known manner. Hereinafter each such surface shall be called a platter. A read/write head (not shown) is provided for each platter. The disks are mounted on vertical shaft for synchronous rotation at a relatively high speed by a motor 24.

The disks assembly is formatted as follows. Each platter has a plurality of concentric tracks. For example, an 8-inch disk may have up to 822 tracks. Each track is divided into eight sectors. Each sector is assigned a unique address within the assembly which is indicative or dependent on the physical position of the sector. For this purpose, the tracks of all the platters are considered to form a three dimensional cylinder so that each sector of a cylinder is designated first before designating the sectors of the next cylinder. More particularly, the outermost tracks (i.e. tracks No. 0) of all the platters form cylinder No. 0, the next tracks (i.e. tracks No. 1) form cylinder No. 1 and so on all the way to cylinder No. 821. Within each cylinder the sectors are numbered starting from the top track. Thus the first sector following a track index mark of the top platter is designated as sector No. 0, the next sector on track No. 0, top platter, is sector No. 1 and so forth. The first sector on track No. 1 of the second platter is sector No. 8.

In reality each section occupies a section of circle of 45°, however, for the sake of simplicity, a track and each component fields are shown as being linear in FIGS. 2A-2E. FIG. 2A shows a typical sector. Each track has a track index mark and seven sector marks which partition the track into eight sectors. In FIG. 2A the track index mark 26 is followed by sector mark 28. Each sector is in turn divided into four fields delineated by flags 30. The fields are separated by gaps 32. Immediately after the sector mark 28, there is an address mark 34 followed by a physical address field 36. This address field identifies the sector by its designated number as defined above. Thus any sector is located by positioning the head for the corresponding platter above the designated track. The hardware within the controller first locates the track index mark 26 and counts sector marks. When the designated sector is reached, the head is alerted by the address mark 34 that the address field 36 is coming up. The data from the address field is compared with the data indicative of the designated sector to confirm that the correct sector has been reached. From the manner in which each sector is designated it is obvious that each address corresponds to the actual physical location of the sector.

The next field is a count field 38. This field is used to indicate whether the sector is operational. More particularly, if the sector is operational, the count field contains a number which is identical to the sector physical address. If the sector has been found to be non-operational because of some physical defects, then the data allocated for this particular sector has been stored into a new sector, and the address of this new sector is found in the count field. Therefore, after the physical address is read from field 36, it is compared to the address in count field 38. If the addresses are identical and also the DEFECTIVE FLAG bit in count field 38 is not set, it is assumed that the sector is operational. Otherwise, the rest of the sector is ignored and the new sector identified by the count field is scanned for the required data. This process is done completely by the controller without any intervention with system program. The next field is a key field 40 which may be used for storing information characterizing the data. The actual contents of this field is left to the customer. Finally, the last field is data field 42 which contains actual data. The data field 52 is followed by another gap 32 and then the next sector starts with a sector mark.

As previously mentioned, the head reads each sector sequentially. The gaps separating the data fields are provided to allow the disk controller to interpret the data collected from the previous field and to determine what action to take next. The gaps 32 may be in the order of 50–60 bytes.

A preferred configuration for each field is shown in FIGS. 2B–2E. Each field starts off with two sync bytes 40 used to synchronize the disk controller to the data on the field. The sync bytes are followed by data bytes corresponding to the appropriate information as described above. The data bytes are followed by a plurality of ECC (error correcting code) bytes used to detect and correct errors in the data bytes. The number of data bytes may vary from field to field. Some typical numbers for the fields are shown in the following Table 1:

TABLE 1

| FIELD | Data Bytes of Each Field | | |
|---|---|---|---|
| | SYNC | DATA | ECC |
| Physical Address | 2 | 4 | 7 |
| Count | 2 | 5 | 7 |
| Key | 2 | 8 | 7 |
| Data | 2 | 2048 | 7 |

The channel controller for the disk assembly is illustrated schematically in FIG. 3. It comprises a microprocessor 30 which controls the major operations of the channel controller. In addition a number of hardwired control circuits are also provided which assist the microprocessor and speed up the overall operation of the disk assembly.

The purpose of the channel controller of FIG. 3 is to selectively store (or write) information from an external volatile memory to the platters previously described, and to retrieve (or read) information from the platters to the external memory. To this end a plurality of data ports 32 and address ports 34 are provided, each of which is adapted to handle 8 bits in parallel. The number of ports required depends on the format of the external memory. Thus for example, if the external memory is based on 32 bit words or bytes and 24 bit addresses, then as shown in FIG. 3, four data ports 32 and three address ports are required. This is done for RESPONSE computer system. There is also provided an 8-bit control bus 36 used to intercorrect the various control circuits as shown.

A data port control circuit 38 is operated under control of the microprocessor 30 and is connected to two FIFO 40, 42 registers of 64 bytes each via a data bus 44.

Similarly, an address port control circuit 46 is provided for controlling the address ports 34. When data is to be stored into the disk assembly, the microprocessor 30 orders circuit 38 to accept data from dataports 32. The address within the external memory for the incoming data is sent by the microprocessor 30 to address port control circuit 46 via control bus 36. The incoming data is transmitted in 8 bit words over data bus 44 from circuit 38 to FIFO register 40.

This data port control circuit 38 stores data between the data ports and the FIFO registers. The address port control circuit is used to determine the external address for the data exchange.

The controller is also provided with a plurality of head I/O circuits 46 which send and receive data from the individual heads floating above the platters previously described. There is an I/O circuit 46 provided for each disk (a maximum of eight disks can be connected to the controller). Each I/O circuit is connected to the respective disk by an appropriate set of I/O lines 48. For example, each set may comprise the following lines: DATA WRITE, WRITE CLOCK, READ DATA, READ CLOCK, SERVO CLOCK, SECTOR MARK, INDEX MARK, and SELECT line (from the disk).

The position of the heads is controlled by a head control circuit 50. The head control circuit is connected to electromechanical head control means (not shown) by a set of control lines 52 in a daisy chain fashion. The set of control lines may comprise the following pairs of lines: COMMAND, UNIT SELECT, CYLINDER and HEAD ADDRESS, and STATUS.

The SECTOR mark and INDEX mark signals are fed from the I/O circuits to a head tracking circuit 54. There is a head tracking circuit for each disk and its purpose is to keep track of the exact location of the corresponding head at all times. The position of each head is provided to a comparator 56.

A maximum of eight disks can be connected to the controller for data storage and retrieval. Since concurrent operation with all the disks connected to the controller is allowed, the desired physical address of a sector decremented by one is stored into head registers 58 (for any desired disks connected to the controller). The contents of the head registers are continuously compared by comparators 56 with the current position of the heads from different disks using circuits 54. When a match is detected indicating that this is the first disk and that its heads have reached the sector preceding its intended destination a signal is sent from the comparator 56 (corresponding to that disk), to the target register 60. The target register in response sends a signal to the microprocessor 30. The microprocessor 30 then requests the CPU for an access permission to volatile memory for data retrieval (this data will be stored from the volatile memory to the mentioned disk).

The microprocessor 30 makes sure that the target sector is reached underneath the head corresponding to the disk. (This process is done by reading the physical address of the sector and comparing it with the address value of the sector which was requested by the system program).

Following the physical address, controller reads the count field and makes sure that the given sector is not defective. (A sector is defective if the defective flag is set in the count field). In case of a defective sector the controller seeks out the alternate sector automatically, using the value of the defective sector count field.

The data from the volatile memory is stored in FIFO 40 byte after byte using data port control circuit 38. The timer control 70 clocks different fields within the sector and once the given subfield approaches the head, the timer control 70 send a signal to the FIFO 40 to release the data bytes to parallel-to-serial converter 62. The converter converts the data from FIFO 40 into a series stream of bits and sends it to an OR gate 64 and to an ECC (error coding correction) circuit 66. The ECC circuit analyzes the data and generates a series of bits (7 bytes) which form the ECC subfield for the appropriate sector field described above. The two data streams are concatenated (DataStream-ECC) into a single stream by gate 64 and sent to the I/O circuits 46, which writes the data at the selected sector of a platter.

The data flow is essentially reversed for the information transfer from the platter to the external memory. The address of the cylinder and head which correspond to the physical address of the sector with desired data is sent to head control circuit 50 and also the same address (after decrementing by one) is sent to head register 58.

The comparator circuit 56 sends a true signal to target register 60 identifying which disk (one of the eight possible disks connected to the controller) is reached to the desired sector minus one. The microprocessor 30 translates the match signal on target register 60 to the corresponding disk and makes a request permission from CPU to store data from the specified disk (one of the eight possible disk) on designated area in volatile memory which has been set aside by the system program. The controller waits for the sector pulse of the next sector and ensures that the target is the desired sector. (This process is done by comparing the physical address which is read from the target sector with the value of the sector which is requested by the system program.) As in case of write operation controller makes sure that the given sector is not defective by examining the defective flag in the count field. The microprocessor then orders the head to read the information from the designated area within the sector. The read data is fed serially to S/P-P/S converter 62 and to ECC circuit 66. The S/P-P/S converter converts the serial data into 8-bit bytes and feeds it to FIFO register 42. From FIFO 42 the data is sent to data port controller circuit 38 via data bus 44 and then to data ports 32. Simultaneously, the microprocessor sends the volatile memory address for the data bytes to address port controller 46 for setting the address ports 34 accordingly. Data from FIFO 42 is received by control circuit 38 in 8 bit bytes as previously mentioned. Circuit 38 collects 1-4 bytes of 8 bits each and provides them to the corresponding data ports as required.

The ECC circuit 66 analyzes the data from buffer 68, including the data bytes and the ECC bytes. If some of the bits received from a field within the sector are found to be erroneous, these bits are corrected using error coding correction. The correct data stream which can be spread within 3 bytes are eventually written to the external memory over the erroneous data. Thus in effect, error correction takes place automatically without any interference from the CPU and system program.

The controller is also provided with a timing control circuit 70 which receives various synchronizing signals such as SERVO CLOCK and generates the required timing and clock signals necessary for the remaining control circuits.

The S/P-P/S converter 62 may comprise a write and a read portion. As shown in FIG. 4 the write portion comprises a buffer register 72, a parallel-to-serial shift register 74 and two AND gates 76, 78. The data from FIFO 40 is dumped into buffer and then converted into a bit stream by register 74. The two AND gates allow either data from register 74 or from the ECC circuit to OR gate 64 in accordance with an ECC OFF signal which is inverted by inverter 80.

The read portion illustrated in FIG. 5 comprises a serial-to-parallel shift register 82 which, after appropriate conversion dumps the data into buffer 84 for later transmission to FIFO 42. The data from register 82 is also provided to a sync detector 86 for detecting the sync bytes which precede the data bytes of each section as described above. When two consecutive sync byte are detected, an appropriate SYNC signal is sent to the timer control 70 to start the read operation for the given subfield within the sector. The input data stream after being delayed by one bit (the second bit of output shift register 82) is also sent to the ECC circuit 66 as shown.

Details of the error corrector coding (ECC) circuit 66 are shown in FIG. 6. The heart of ECC hardware is composed of 4 shift registers P0 90, P1 91, P2 92, P3 93. The above registers are 22, 11, 12 and 11 bits respectively. During write operation (data goes from volatile memory to the disk), data stream from shift register 74 (FIG. 4) and P0 bit 21 are EORed 96 together. The result is ANDed 97 with write command (to make sure that this part of circuit only works for write operation) and finally the output of AND 97 gate is directed to all the shift registers.

Clock generator 94, generates appropriate clocks for P0 90, P1 91, P2 92, P3 93 depending on read or write operation.

P0 bit 21 is qualified (ANDed 99) with ECC Data Stream Decode and the output of AND gate is directed to AND gate 78 (FIG. 4). AND gate makes sure that the ECC data will be concatenated immediately after the data stream for all the subfield within a sector.

During the Read operation the input data from shift register 82 is ANDed 98 with Read Command and the output of the AND gate is directed to P0, P1, P2 and P3. The data and ECC bytes which follows data stream are continuously directed to the shift registers P0, P1, P2, P3 from the output of AND gate 98. And one clock time after the last bit of ECC stream the comparator circuits 95 makes sure that there is no data error within any subfield of a sector.

In case of error, microprocessor 30 corrects the erroneous data using the remainder value in P0, P1, P2 and P3.

The ECC circuit can detect 22 bits of error and correct 11 continuous bits of error.

Obviously numerous modifications can be made to the system without departing from the scope of the invention as defined in the appended claims.

What is claimed is:

1. A disk channel controller for a disk assembly having a plurality of disks for data storage, and a plurality of heads which may be positioned on preselected portions of the disks for data transmission and retrieval from a disk, said controller comprising:

data port means for exchanging data bits;

address port means for exchanging address bits;

first temporary memory means;

head control tracking means for tracking the positions of the heads; and microprocessor means for storing data received through said data port means to a first address defined by data address bits from said data port means by first storing said received data bits into said temporary memory means, ordering one of said heads to move to a first portion of a disk corresponding to said first address and after said head tracking means indicates that a portion preceding said preselected portion has been reached, transferring the data from said temporary means to the disk;

said microprocessor means being further provided to retrieve data from a second portion defined by a second address from said address port means by positioning said heads above the second position and transferring data from said second portion to said data ports, and wherein said disks comprise two opposed platters, each platter being sectioned into concentric tracks, and each track being sectioned into sectors, said sectors being ordered in a preselected manner, and wherein the track sectors are ordered by designating consecutive addresses to all the sectors of all the outermost tracks of the disks, followed by the sectors of sectors adjacent to the outermost tracks, and so on until the sectors of the innermost tracks are designated, and wherein each sector partitioned into a physical address field for holding data indicative of the designated address for the sector, a count field for holding error data bits indicative of whether the sector is defective and for holding an alternate address if the sector is defective, a key field for customer use and a data field for customer use.

* * * * *